United States Patent [19]

Yamamoto

[11] Patent Number: 5,056,640
[45] Date of Patent: Oct. 15, 1991

[54] TORQUE TRANSMISSION DEVICE FOR A FOUR-WHEEL DRIVE VEHICLE

[75] Inventors: Masaji Yamamoto; Shigeo Tanooka, both of Okazaki; Toshifumi Sakai, Nukata; Nobunao Morishita, Okazaki, all of Japan

[73] Assignees: Toyota Motor Corporation, Aichi; Toyoda Koki Kabushiki Kaisha, Kariya, both of Japan

[21] Appl. No.: 439,429

[22] Filed: Nov. 21, 1989

Related U.S. Application Data

[62] Division of Ser. No. 165,072, Mar. 7, 1988, Pat. No. 4,905,808.

[30] Foreign Application Priority Data

Oct. 5, 1987 [JP] Japan .................. 62-251305
Nov. 27, 1987 [JP] Japan .................. 62-297391
Dec. 26, 1987 [JP] Japan .................. 62-198046[U]

[51] Int. Cl.⁵ .................. B60K 17/348; F16D 25/02; F16D 25/0638
[52] U.S. Cl. .................. 192/85 AA; 192/103 F; 180/248
[58] Field of Search .............. 192/35, 57, 58 B, 58 C, 192/85 AA, 103 F; 180/233, 248, 249

[56] References Cited

U.S. PATENT DOCUMENTS

| 3,490,312 | 1/1970 | Seitz et al. | 475/88 |
| 3,534,633 | 1/1970 | Chocholek | 475/86 |
| 3,628,399 | 12/1971 | Seitz et al. | 475/88 |
| 4,012,968 | 3/1977 | Kelbel | 475/88 |
| 4,013,154 | 3/1977 | Brown | 192/58 B |
| 4,031,780 | 6/1977 | Dolan et al. | 475/85 |
| 4,040,271 | 8/1977 | Rolt et al. | 192/58 B |
| 4,048,872 | 9/1977 | Webb | 475/85 |
| 4,058,027 | 11/1977 | Webb | 475/85 |
| 4,369,671 | 1/1983 | Matsumoto et al. | 475/124 |
| 4,444,298 | 4/1984 | Stangroom | 192/21.5 |
| 4,662,499 | 5/1987 | Jordan | 192/82 T |
| 4,667,534 | 5/1987 | Kataoka | 475/160 |
| 4,719,998 | 1/1988 | Hiramatsu et al. | 192/0.033 |
| 4,821,604 | 4/1989 | Asano | 192/103 F X |
| 4,905,808 | 3/1990 | Tomita et al. | 192/85 AA |
| 4,909,371 | 3/1990 | Okamoto et al. | 192/103 F |

FOREIGN PATENT DOCUMENTS

| 0202951 | 11/1986 | European Pat. Off. . |
| 0236650 | 9/1987 | European Pat. Off. . |
| 3545540 | 7/1987 | Fed. Rep. of Germany . |
| 3706075 | 8/1987 | Fed. Rep. of Germany . |
| 60-252026 | 12/1985 | Japan . |
| 2163107 | 2/1986 | United Kingdom . |
| 2171967 | 9/1986 | United Kingdom . |

Primary Examiner—Richard Lorence
Attorney, Agent, or Firm—Oblon, Spivak, McClelland, Maier & Neustadt

[57] ABSTRACT

A torque transmission device is provided wherein a rotary housing is connected to one of front and rear drive shafts which respectively drive front and rear axles of a four-wheel drive vehicle, while a rotary shaft coaxially carried by the rotary housing is connected to the other of the front and rear drive shafts. The housing receives therein a multiple disc clutch device for transmitting rotational power between the housing and the shaft through friction engagement between alternately arranged outer and inner clutch discs which are respectively rotatable bodily with the housing and the shaft. The housing also receives an axially movable piston to press the clutch discs for friction engagement. An end wall of the housing or an end cap secured thereto and a facing end surface of the piston define an axially narrow circular chamber, within which a rotor with a plurality of radially extending blade portions provided with a pair of slanted surfaces is received to be rotated by the shaft. A several space sections into which the chamber is divided by the rotor blade portions are filled with silicon oil of a high viscosity. When the rotational speed difference occurs between the rotor and the housing, a pressure is generated within each of the space sections thanks to the high viscosity of the silicon oil and is directly applied to the piston, whereby rotational power is transmitted from the housing to the rotary shaft and vice versa.

3 Claims, 13 Drawing Sheets

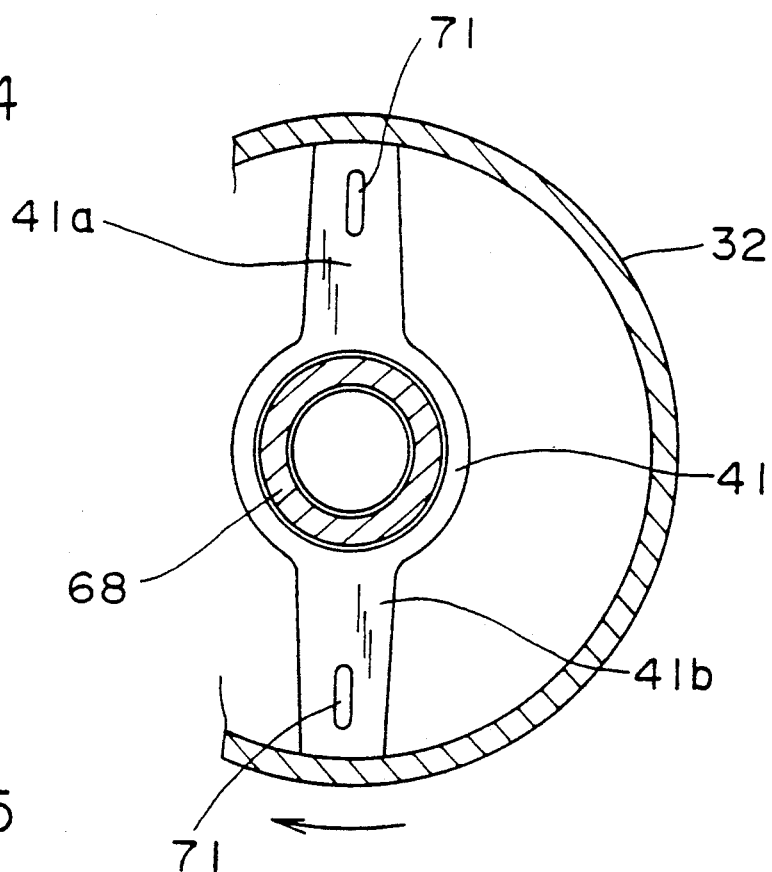
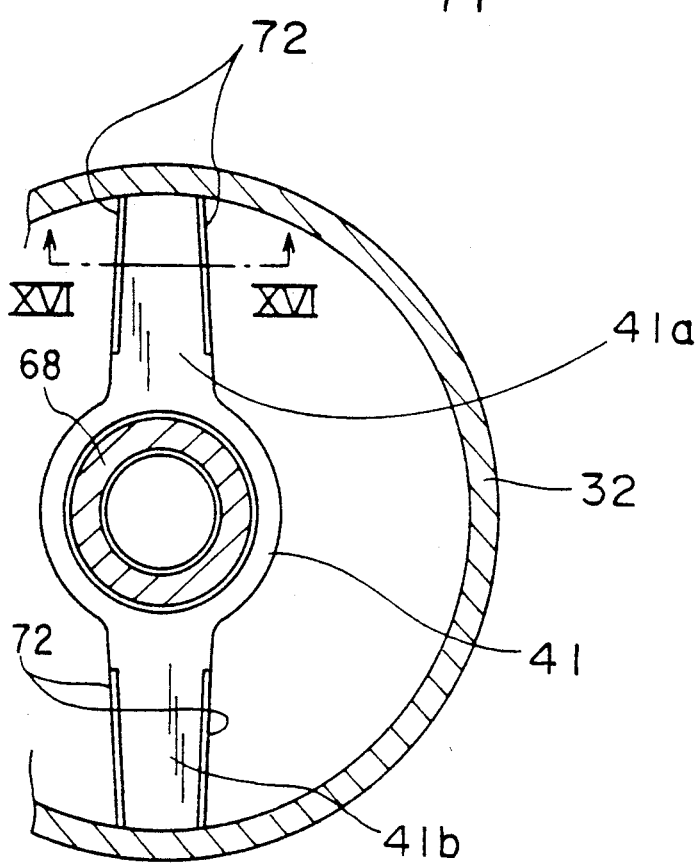
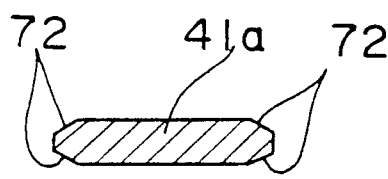

TORQUE TRANSMISSION DEVICE FOR A FOUR-WHEEL DRIVE VEHICLE

This is a division of application Ser. No. 07/165,072, filed on Mar. 7, 1988 now U.S. Pat. No. 4,905,808.

BACKGROUND OF THE INVENTION

1. Field of the Invention

The present invention relates to a device for transmitting rotational torque between front and rear wheels in a four-wheel drive vehicle.

2. Discussion of the Prior Art

As disclosed in Japanese unexamined patent publication No. 60-252026 for example, there has been known a four-wheel drive vehicle of the type that a conventional oil pump is driven upon occurrence of the rotational speed difference between two coaxial drive shafts respectively connected to front and rear wheels and that a hydraulically operated clutch for effecting selective driving connection between the two drive shafts is operated in response to the discharge pressure from the oil pump corresponding to the rotational speed difference.

In a torque transmission device for the known four-wheel drive vehicle, the oil pump of plunger or vane type is interposed between the front and rear wheel drive shafts so as to discharge oil of the pressure corresponding to the rotational speed difference between the drive shafts. The pressurized oil from the pump is admitted into a cylinder chamber of the hydraulic clutch through a fluid passage formed in one of the drive shafts, so that the clutch can be hydraulically operated to drivingly connect the drive shafts with each other.

However, in the torque transmission device of the aforementioned type, the conventional oil pump interconnected between the front and rear drive shafts is relatively large in axial width thereof, and the fluid passage has to be provided for admitting the discharge pressure from the oil pump into the hydraulic clutch. This disadvantageously results in a complicated and large construction of the torque transmission device as well as in an increased cost for manufacturing.

SUMMARY OF THE INVENTION

Accordingly, it is a primary object of the present invention to provide an improved torque transmission device for a four-wheel drive vehicle in which a pressure generation means for actuating a clutch operating piston can be made small in size as well as in weight.

Another object of the present invention is to provide an improved torque transmission device for a four-wheel drive vehicle in which an axially narrow or thin rotor can be used as a pressure generation means for actuating a clutch operating piston, thereby minimizing the entire size and weight of the device.

Still another object of the present invention is to provide an improved torque transmission device of the character set forth above wherein the torque transmission character thereof can be easily tuned up.

Yet another object of the present invention is to provide an improved torque transmission device of the character set forth above wherein the transmissive torque thereby can be controlled depending upon driving conditions of the vehicle.

A further object of the present invention is to provide an improved torque transmission device for a four-wheel drive vehicle wherein the flexing of blade portions of a pressure generating rotor can be minimized thereby avoiding local abrasion of the rotor and the end surfaces on which the rotor frictionally slides.

A still further object of the present invention is to provide an improved torque transmission device for a four-wheel drive vehicle wherein the force to press multiple outer and inner clutch discs is mechanically augmented when the rotational speed difference between the outer and inner clutch discs exceeds a predetermined speed, thereby preventing the clutch discs from suffering from excessive abrasion.

An additional object of the present invention is to provide an improved torque transmission device for a four-wheel drive vehicle wherein the relative rotation between a rotary housing and a clutch operating piston received therein can be restricted without using any pin member, thereby obviating the failure to assemble any such pin member into the device.

An yet additional object of the present invention is to provide an improved torque transmission device for a four-wheel drive vehicle in which the thermal changes in volume of a lubricant filled within a clutch disc chamber can be reliably absorbed, thereby maintaining the clutch disc chamber completely isolated from the atmosphere Briefly, in a torque transmission device for a four-wheel drive vehicle according to the present invention, a rotary housing and a rotary shaft are respectively connected to one and the other of front and rear drive shafts which are rotatable about a common axis for transmitting rotational power to front and rear axles of the vehicle. A multiple disc clutch is incorporated in the rotary housing, with several outer discs being rotatable with the rotary housing and several inner discs being arranged in alternate fashion with the outer discs to be rotatable bodily with the rotary shaft. A piston is axially movably received within the rotary housing to press the clutch discs at one axial end thereof. The other axial end of the piston, together with the housing, defines an axially narrow circular rotor chamber, within which a rotor having a plurality of radially extending blade portions is received for rotation bodily with the rotary shaft. The blade portions divides the rotor chamber into plural space sections, in each of which a high viscous fluid is filled. When the rotor rotates relative to the rotary housing due to the rotational speed difference between the front and rear drive shafts, a pressure is generated within each of the space sections, which causes the piston to press the clutch discs. Thus, the outer and inner clutch discs are brought into driving connection, so that rotational torque is transmitted from one of the front and rear drive shafts and vice versa.

With this configuration, because the use of the high viscous fluid permits the piston to be axially narrow and because a pressure generation chamber within which the rotor rotates and a pressure chamber for the piston share a common space, the transmission device can be made small in size. Further, since the piston exposes the other end surface thereof to pressure within the pressure generation chamber (i.e., the rotor chamber), no communication passage is required to fluidcally connect the pressure generation chamber to the piston chamber, contrary to the known device which uses a conventional hydraulic pump and a separate cylinder device.

BRIEF DESCRIPTION OF THE ACCOMPANYING DRAWINGS

The foregoing and other objects, features and many of the attendant advantages of the present invention will be readily appreciated as the same becomes better understood by reference to the following detailed description of the preferred embodiments, wherein like reference numerals designate identical or corresponding parts throughout the several views, and in which:

FIG. 14 is a cross-sectional view of a further torque transmission device constituting a seventh embodiment;

FIG. 15 is a cross-sectional view of an eighth embodiment according to the present invention;

FIG. 16 is a fragmentary sectional view taken along the line XVI—XVI in FIG. 15;

DETAILED DESCRIPTION OF THE PREFERRED EMBODIMENTS

Figure 1:
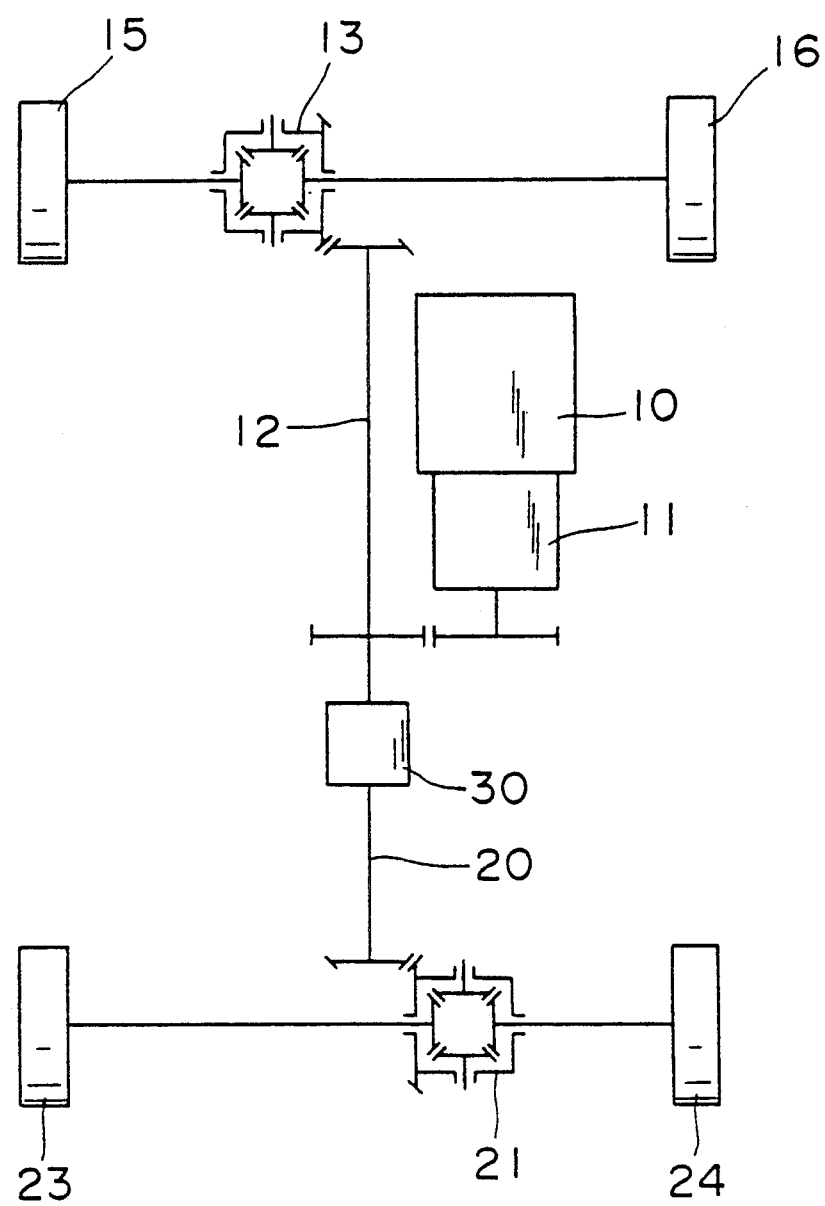
FIG. 1 is a schematic view of a drive system for a four-wheel drive vehicle incorporating a torque transmission device according to the present invention.

Referring now to FIG. 1, there is schematically shown a drive system of a four-wheel drive vehicle comprising an engine 10, which transmits the rotational power to a front drive shaft 12 through a transmission 11. The rotation of the shaft 12 is in turn transmitted to left and right front wheels 15, 16 through a front axle including a front differential unit 13. The front drive shaft 12 is drivingly connected to a rear drive shaft 20 through a torque transmission device 30 according to the present invention which is constructed as referred to later. The rotational torque transmitted to the rear drive shaft 20 is further transmitted to left and right rear wheels 23, 24 through a rear axle including a rear differential unit 21. Various embodiments of the torque transmission device 30 will be described hereinafter.

Figure 2:
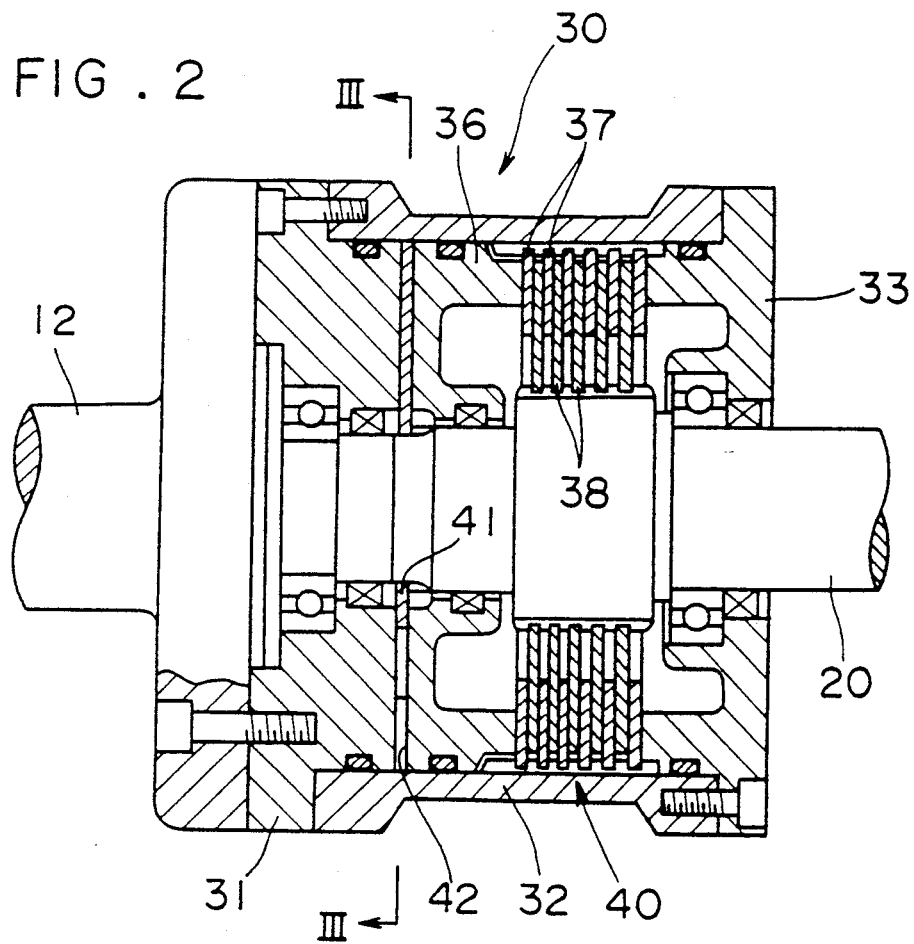
FIG. 2 is a longitudinal sectional view of the torque transmission device constituting a first embodiment.

Referring now to FIG. 2 showing a first embodiment of the present invention, reference numeral 31 denotes a front end cap 31 connected to one end of the front drive shaft 12. A cylindrical rotary housing 32 provided coaxially with the front drive shaft 12 is secured to the front end cap 31 at one end and to a rear end cap 33 at the other end. The front end cap 31, the rotary housing 32 and the rear end cap 33 compose a rotary housing assembly. The end caps 31, 33 rotatably carries one end portion of the rear drive shaft 20 through a pair of bearings (not numbered) in coaxial relation with the front drive shaft 12.

A plurality of outer clutch discs 37 are spline-engaged with an internal surface of the rotary housing 32, while a plurality of inner clutch discs 38 are spline-engaged with an external surface portion of the rear drive shaft 20. The outer and inner clutch discs 37, 38 are arranged in alternate fashion, thereby constituting a multiple disc clutch 40. The rotary housing 32 slidably receives a clutch operating piston 36 between the front end cap 31 and the multiple disc clutch 40. The pressure acting on the piston 36 moves the same to press the clutch discs 37, 38. Thus, a drive torque applied to the rotary housing 32 from the front drive shaft 12 is transmitted to the rear drive shaft 20 through the clutch discs 37, 38. The torque so transmitted to the rear drive shaft 20 varies depending on the pressure acting on the piston 36.

Figure 3:
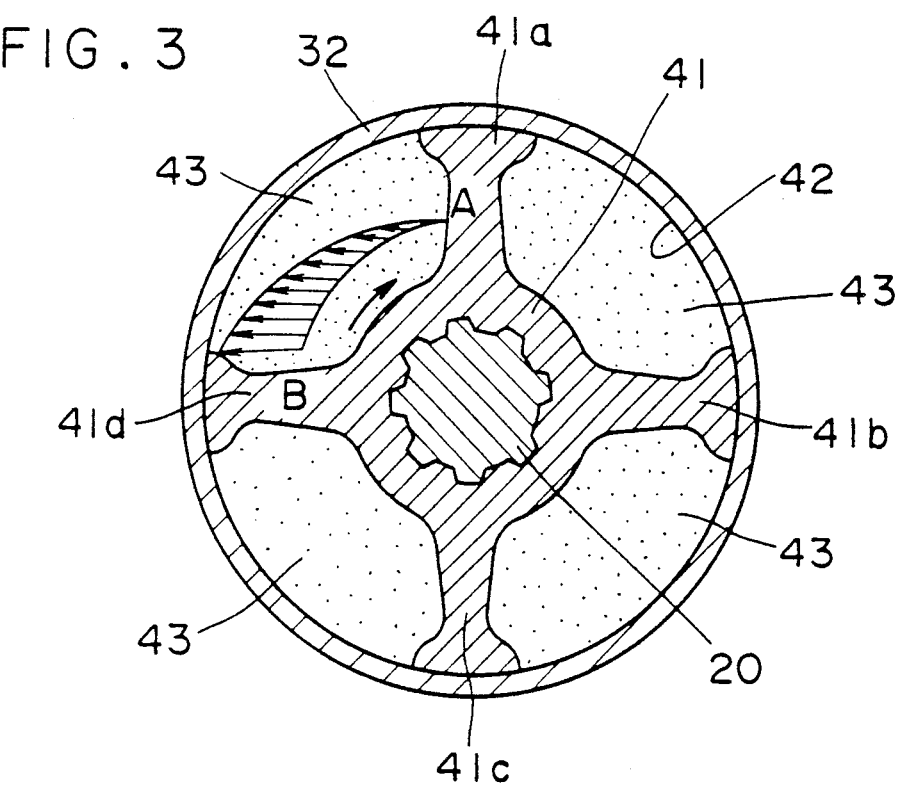
FIG. 3 is a cross-sectional view of the device taken along the line III—III in FIG. 2.
Figure 4:
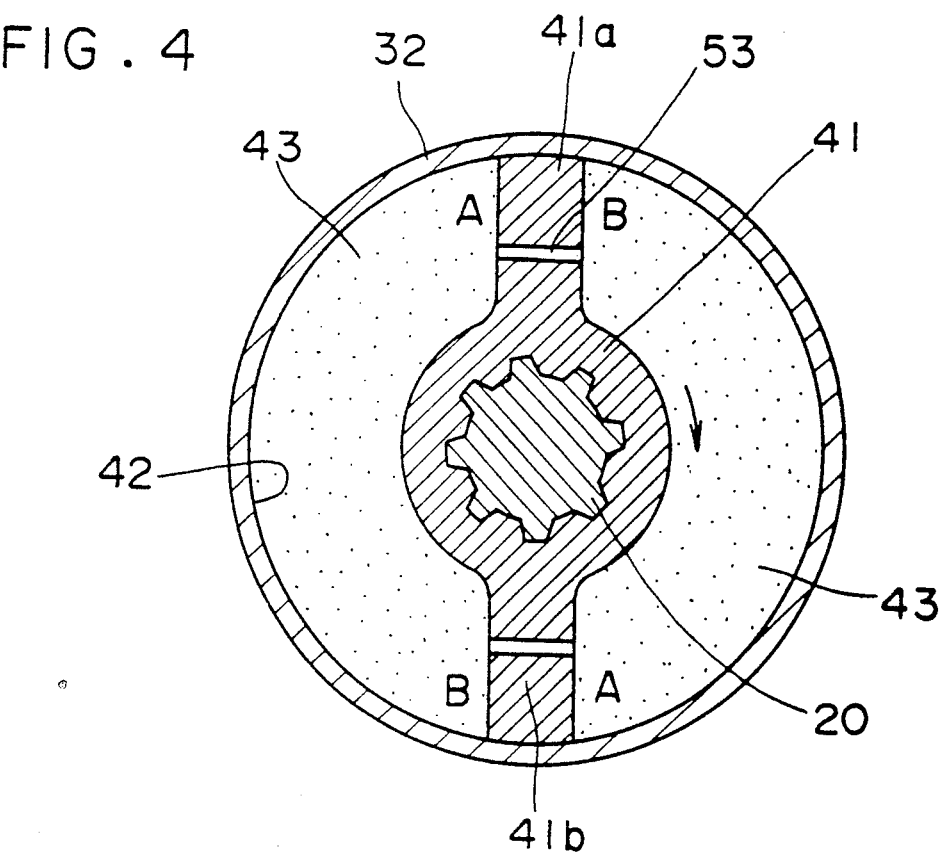
FIG. 4 is another cross-sectional view taken along the same line as FIG. 3, but constituting a second embodiment of the present invention.

Between the facing end surfaces of the front end cap 31 and the piston 36, there is defined a circular rotor chamber 42, within which a thin impeller or rotor 41 of approximately the same axial width (e.g., 2 or 3 millimeters) as that of the chamber 42 is received with opposite end surfaces thereof being slidable on the facing end surfaces of the front end cap 31 and the piston 36. As shown in FIG. 3, the rotor 41 is spline-connected at its central portion with the external surface of the rear drive shaft 20 and is provided with a plurality (four in this embodiment) of blade portions 41a–41d which radially extend at regular intervals in circumferential direction. External end surfaces of the blade portions 41a–41d are in slidable contact with the internal surface of the rotary housing 32, thereby constituting sealing portions. Thus, the rotor chamber 42 between the piston 36 and the front end cap 31 is circumferentially divided by the blade portions 41a–41d into four space sections 43, within which high viscous fluid is filled.

Preferably, silicon oil having kinematic viscosity of 100 thousands centistokes may be used as the high viscous fluid to be filled up to 90% in volume of each of the space sections 43. Further, the rotor 41 has an axial clearance of 0.1–0.65 mm (millimeter) at either side relative to the front end cap 31 and the piston 36 and a radial clearance of 0.05–0.025 mm at each of the external end surface relative to the internal surface of the rotary housing 32. Normally, the axial clearance between any adjacent two of the clutch discs 37, 38 is set in the range of 0–0.1 millimeter, and those at the axial opposite axial sides of the clutch discs 37, 38 are maintained in friction contact with the piston 36 and the rear end cap 33. However, the piston 36 is axially moved 0.1 millimeter to press the clutch discs 37, 38 when torque of a magnitude, e.g., 20 kg-cm (kilogrammeters) is transmitted between the front and rear drive shafts 12, 20. It should be realized that the aforementioned numerical data vary depending upon the torque required to be transmitted and are recited for the sake of exemplification.

Operation of the apparatus as constructed above will be described hereinafter. When the relative rotation between the front and rear drive shafts 12, 20 causes the rotor 41 to rotate relative to the rotary housing 32, the high viscous oil filled within each of the space sections 43 is compulsorily moved between two close end surfaces of the piston 36 and the front end cap 31 at the velocity corresponding to the rotational speed difference. At this time, a pressure is generated within each of the space sections 43 due to friction of the high viscous oil with the two close end surfaces which rotate bodily with the rotary housing 32. More specifically, assuming now that an area right behind a preceding blade portion and an area right before another blade portion following the same are respectively named as A and B, there occurs a pressure distribution which has the highest pressure at the area B and the lowest pressure at the area A, as depicted in FIG. 3, when the rotor 41 rotates in a clockwise direction. The pressure generated within each of the space sections 43 is proportional to the rotational speed difference between the rotor 41 and the rotary housing 32. Since the pressure so generated directly acts on the piston 36, the multiple clutch discs 37, 38 are pressed on each other, whereby the rotational torque from the front drive shaft 12 is transmitted to the rear drive shaft 20 through the multiple clutch discs 37, 38.

Accordingly, when a large rotational speed difference occurs between the front and rear drive shafts 12, 20 due to the slippage of the front wheels 15, 16 or the rear wheels 23, 24 as is true in the case that the vehicle travels on roads of a small coefficient of friction such as muddy roads, snow covered roads, etc., the pressure generated within the space sections 43 increases thereby to assure the four wheel driving. On the other hand, when the vehicle turns at corners of well-conditioned roads, a small rotational speed difference occurs between the front and rear drive shafts 12, 20. This permits the outer and inner clutch discs 37, 38 to slip with each other, whereby the occurrence of braking phenomenon at tight corners can be avoided.

Figure 5:
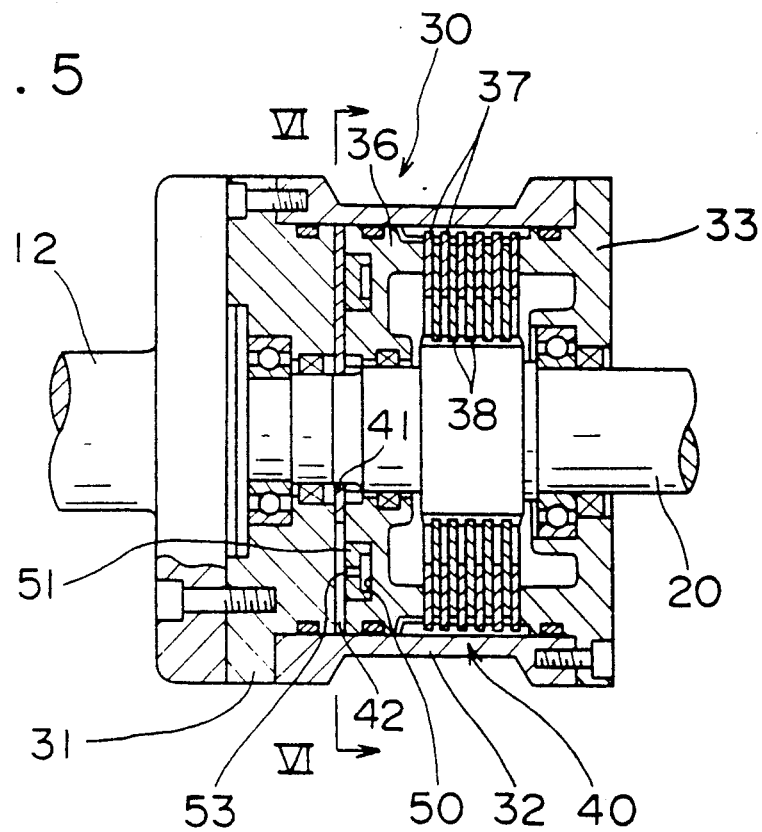
FIG. 5 is a longitudinal sectional view of a third embodiment of the torque transmission device according to the present invention.
Figure 6:
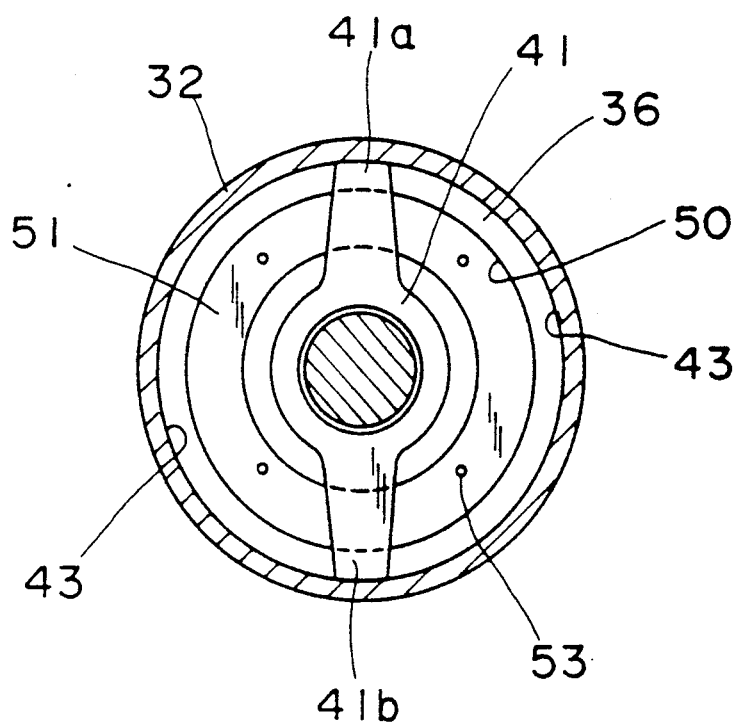
FIG. 6 is a cross-sectional view taken along the line VI—VI in FIG. 5.
Figure 7:
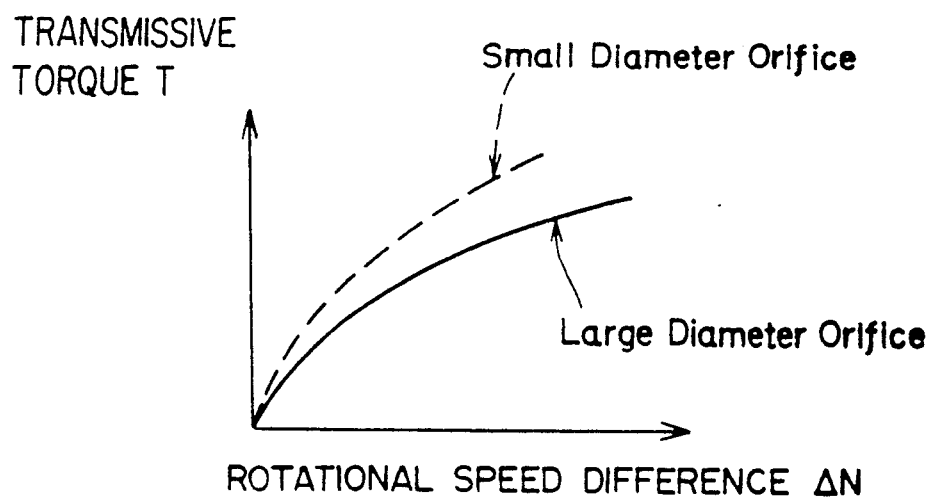
FIG. 7 is a graph showing a transmissive torque characteristic of the second and third embodiments.

FIGS. 4 to 7 show second and third embodiments of the present invention, wherein the torque transmission device as described above is improved in that means is provided for tuning up the torque transmission characteristic. In the second embodiment shown in FIG. 4, a throttle hole or orifice 53 is formed in each of two blade portions 41a, 41b of the rotor 41 so that a pressure is relieved from the high pressure area B right before each of the blade portions 41a–41b to the low pressure area A right behind the same blade portion. Thus, by varying the diameter of the orifice 53, the pressure generated within each of two space sections 43 is adjusted, so that the force of the piston 36 pressing the clutch discs 37, 38 and hence the transmissive torque can be tuned up by varying the diameter of the orifices 53, as shown in FIG. 7.

The same effect as in the second embodiment can be achieved by the third embodiment shown in FIGS. 5 and 6. In this embodiment, an annular groove 50 is formed at one end surface of the piston 36 which faces the rotor 41, and an annular plate 51 is tightly fitted in the annular groove 50 to constitute an annular channel (not numbered) in the piston 36. A plurality (preferably, four) of orifices 53 are formed in the annular plate 51 at a regular circumferential interval each for communication with the rotor chamber 42 and the annular channel in the piston 36.

Figure 8:
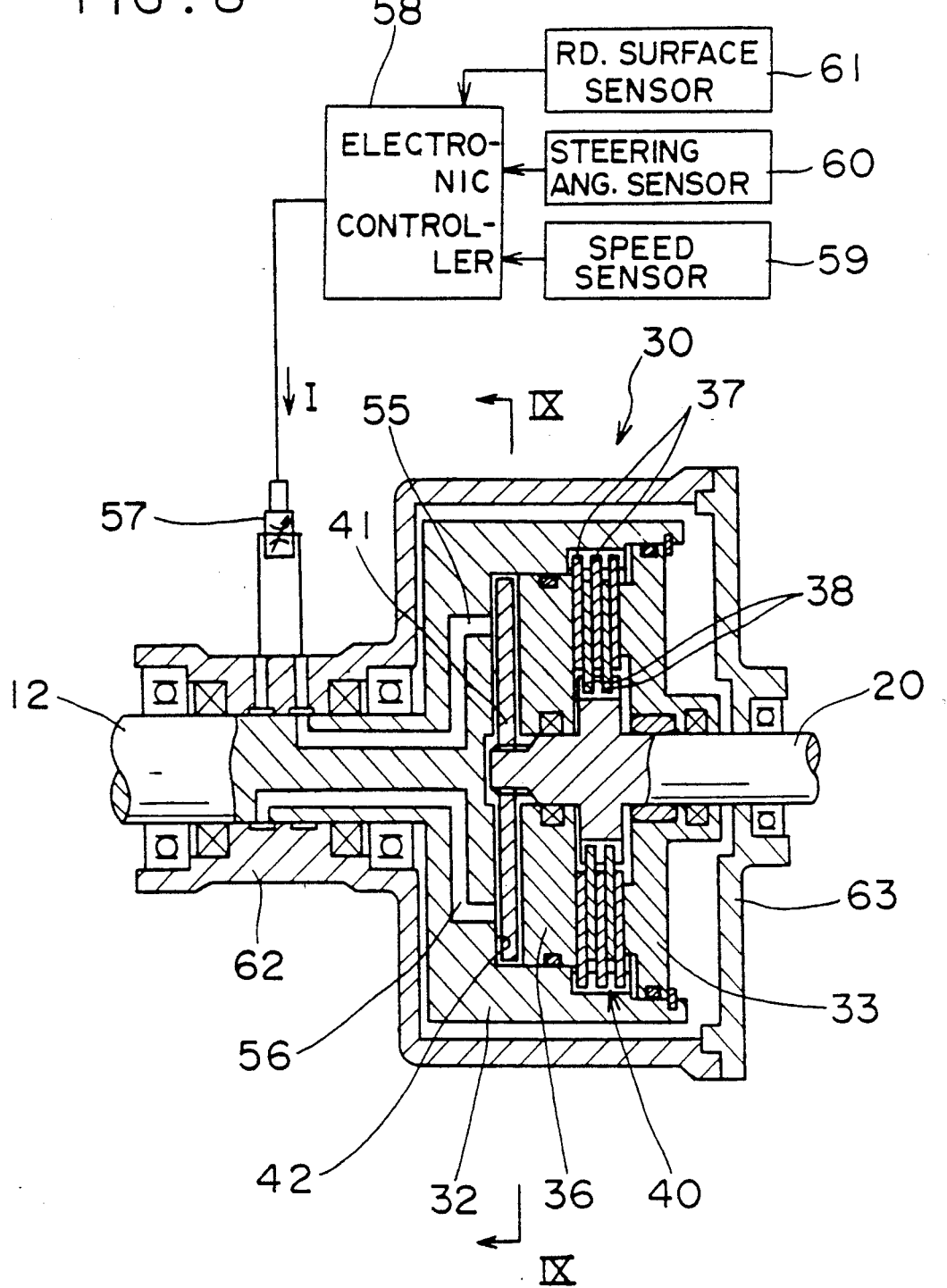
FIG. 8 is a longitudinal sectional view of the torque transmission device constituting a fourth embodiment of the present invention, also showing a block diagram of a control circuit therefor.
Figure 9:
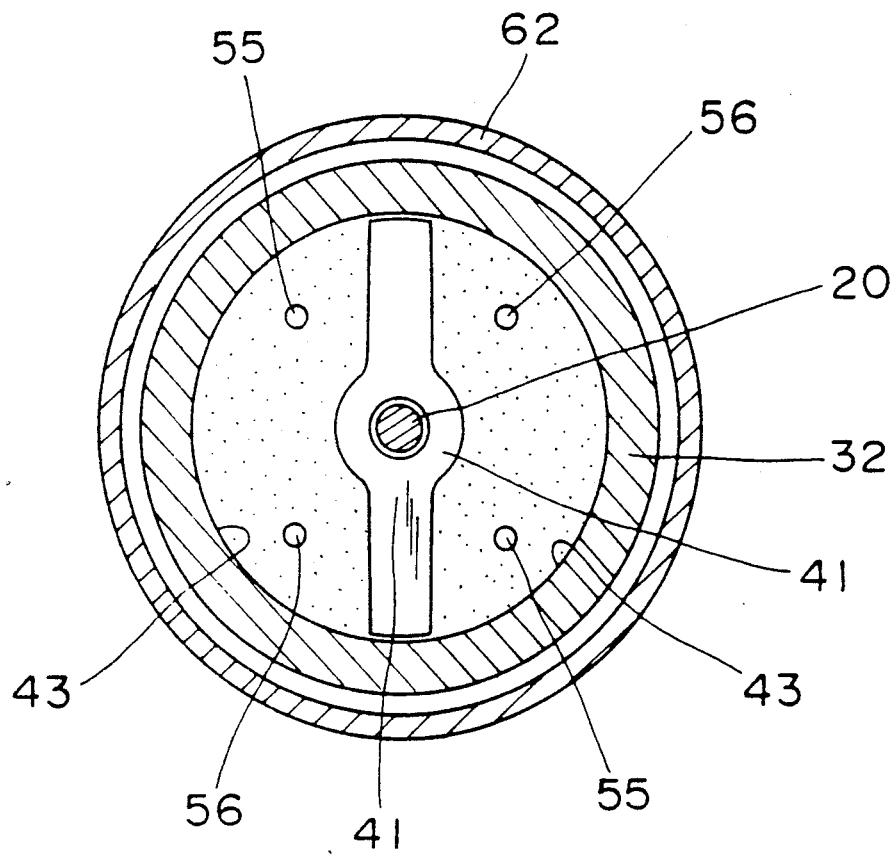
FIG. 9 is a cross-sectional view taken along the line IX—IX in FIG. 8.
Figure 10:
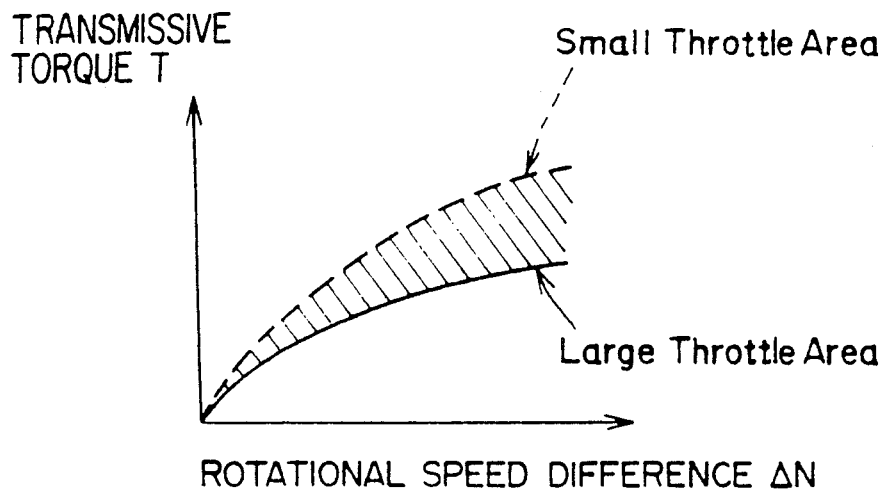
FIG. 10 is a graph showing the torque transmissive characteristic of the fourth embodiment.

FIGS. 8 to 10 show a fourth embodiment of the present invention, in which the transmissive torque can be controlled depending upon the driving conditions of the vehicle. The front end cap which is illustrated as one body with the front drive shaft 12 and the rotary housing 32 is formed with a plurality (preferably, two pairs) of bypass passages 55, 56 which open to the rotor chamber 42 at a regular circumferential interval. The first pair of diametrically mating bypass passages 55, 55 are always in communication with each other, and the second pair of diametrically mating holes 56, 56 are also always in communication with each other. In order to permit selective communication between the bypass passages 55 and 56, there is provided an electromagnetic throttle valve 57. This valve 57 varies the degree of its throttle opening depending upon the magnitude of an electric current (I) applied from an electronic controller 58. The controller 58 determines the magnitude of the electric current (I) based on various information applied thereto from, for example, a vehicle speed sensor 59, a steering angle sensor 60 and a road surface sensor 61 which detects the coefficient of friction of the road on which the vehicle travels. Consequently, the opening degree of the throttle valve 57 is varied based on the vehicle traveling conditions. This results in controlling the pressure generated within the rotor chamber 42, whereby the transmissive torque can be varied within the range indicated by the solid and broken curves in FIG. 10. In FIG. 8, numeral 62 denotes a device housing rotatably carrying the front drive shaft 12 and numeral 63 denotes a cap closing an opening end of the device housing 62 and rotatably carrying the rear drive shaft 20.

Figure 11:
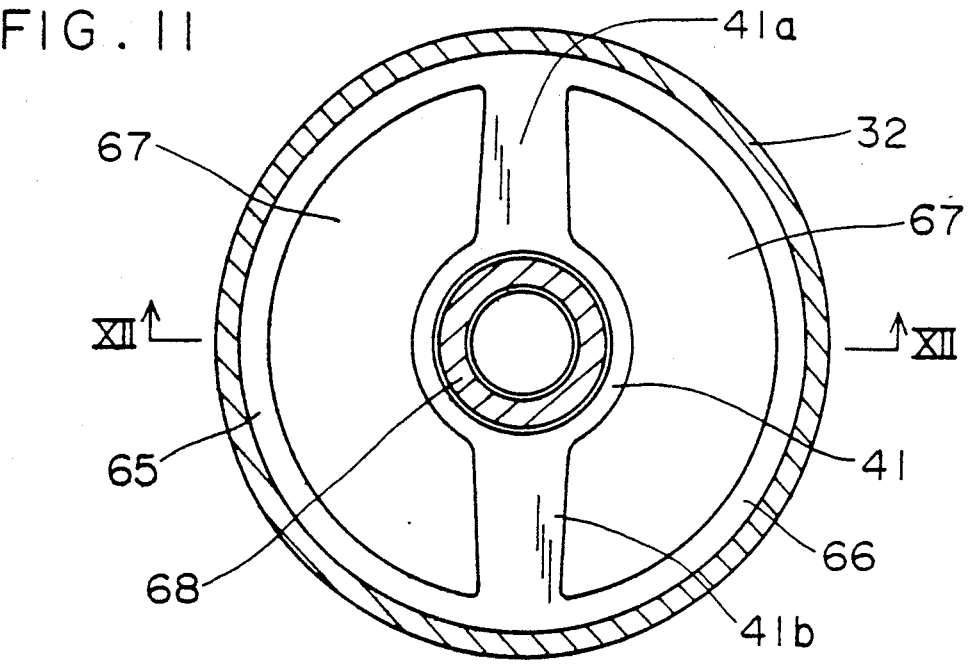
FIG. 11 is a cross-sectional view of another torque transmission device constituting a fifth embodiment of the present invention.
Figure 12:
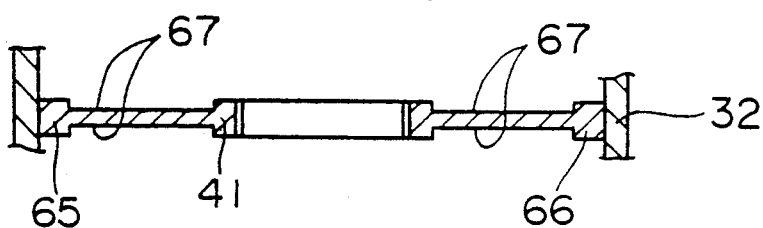
FIG. 12 is a fragmentary sectional view taken along the line XII—XII in FIG. 11.
Figure 13:
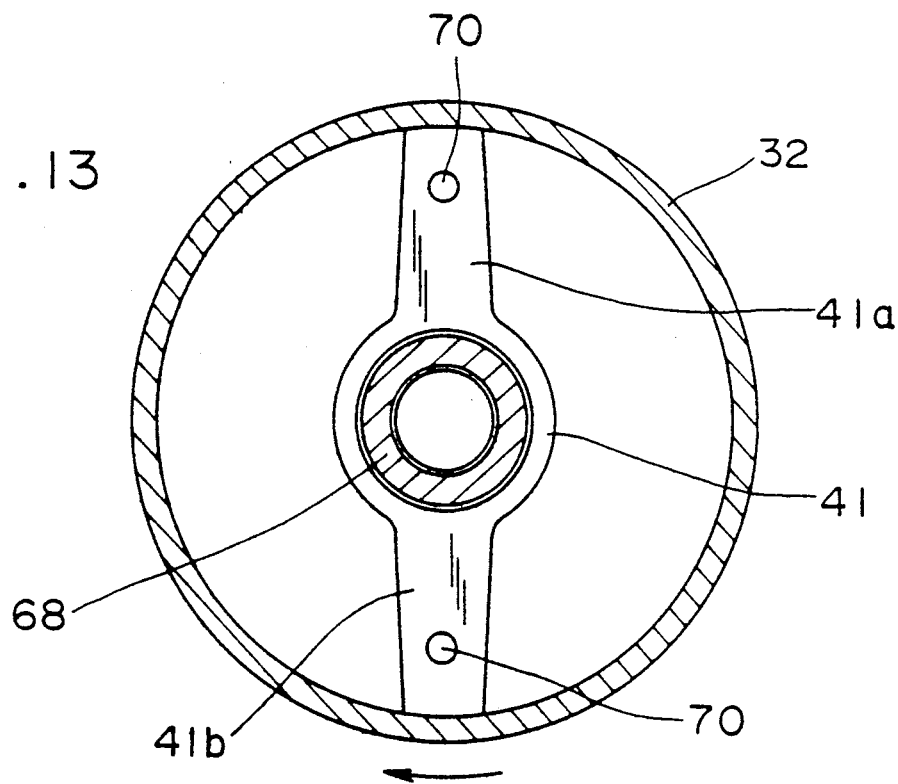
FIG. 13 is a cross-sectional view of still another torque transmission device constituting a sixth embodiment of the present invention.

Referring then to FIGS. 11–16, there are shown fifth through eighth embodiments, in each of which an improvement is made to prevent the rotor blade portions from flexing or bending during rotation. In the fifth embodiment shown in FIGS. 11 and 12, the rotor 41 is formed generally as a disc. The rotor 41 is formed with a pair of diametrically opposite blade portions 41a, 41b of a uniform thickness, a pair of semi-circular circumferential edge portions 65, 66 having the same thickness as the blade portions 41a, 41b, and four semi-circular or sector cavities 67 which are symmetrically defined by the blade portions 41a, 41b and the edge portions 65, 66 at axial opposite ends of the rotor 41. When the rotor 41 is rotated within the rotor chamber 42, the same pressure is generated within the sector cavities 67, whereby the rotor 41 can be rotated at the mid position in the axial direction within the rotor chamber 42. This advantageously results in preventing the end surfaces of the rotor 41, front end cap 31 (or housing 32) and piston 36 from suffering from local abrasion. In FIG. 11, reference numeral 68 denotes a rear shaft sleeve which is connectable with the rear drive shaft 20 through spline engagement, as shown, for example, in FIG. 17.

The sixth to eights embodiments use the rotor 41 having a pair of diametrically opposite blade portions 41a, 41b as used in the aforementioned second embodiment. In the sixth embodiment shown in FIG. 13, the rotor 41 is provided with a pair of round communication holes 70, 70 which extend across the blade portions 41a, 41b to open to the opposite sides thereof. Similarly, in the seventh embodiment shown in FIG. 14, a pair of elongate communication holes 71, 71 are formed in the blade portions 41a, 41b of the rotor 41 in place of the round holes 70, 70 as used in the sixth embodiment. In any of these embodiments, the pressures at the axial opposite sides of the blade portions 41a, 41b are balanced by virtue of the communication holes 70, 70 or 71, 71. Thus, the flexing of the blade portions 41a, 41b due to the pressure unbalance at the axial opposite sides thereof can be obviated, thereby avoiding local abrasion of the blade portions 41a, 41b and the side surfaces of the front end cap 31 (or rotary housing 32) and the piston 36 which may otherwise be caused by the deviation of the blade portions 41a, 41b.

The eighth embodiment shown in FIGS. 15 and 16 uses the rotor 41 wherein each of the blade portions 41a, 41b is sharpened as knife edge at front and rear edges in the rotational direction. In this particular embodiment, a pair of wedge shape spaces are defined by the slanted surfaces of each knife edge portion 72 and the end surfaces of the front end cap 31 (or rotary housing 32) and the piston 36. Upon rotation of the rotor 41, the wedge shape spaces positively admit the high viscous oil therein, so that the high viscous oil so admitted generates a righting force to position the blade portions 41a, 41b to the axial mid position within the rotor chamber 42.

Figure 18:
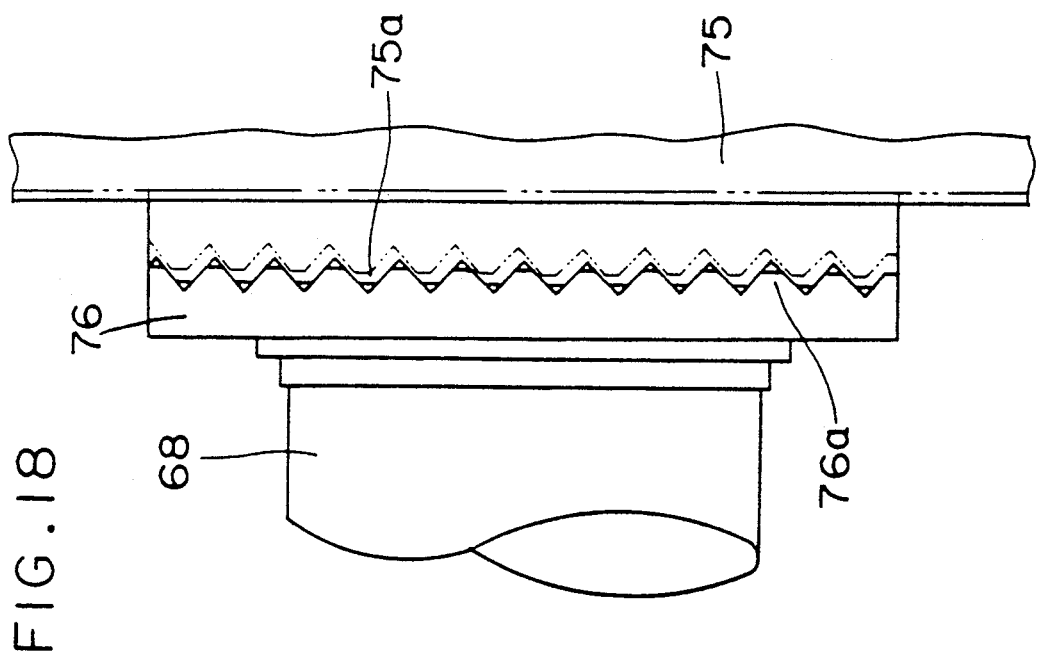
FIG. 18 is an enlarged fragmentary view of a portion shown in FIG. 17.
Figure 17:
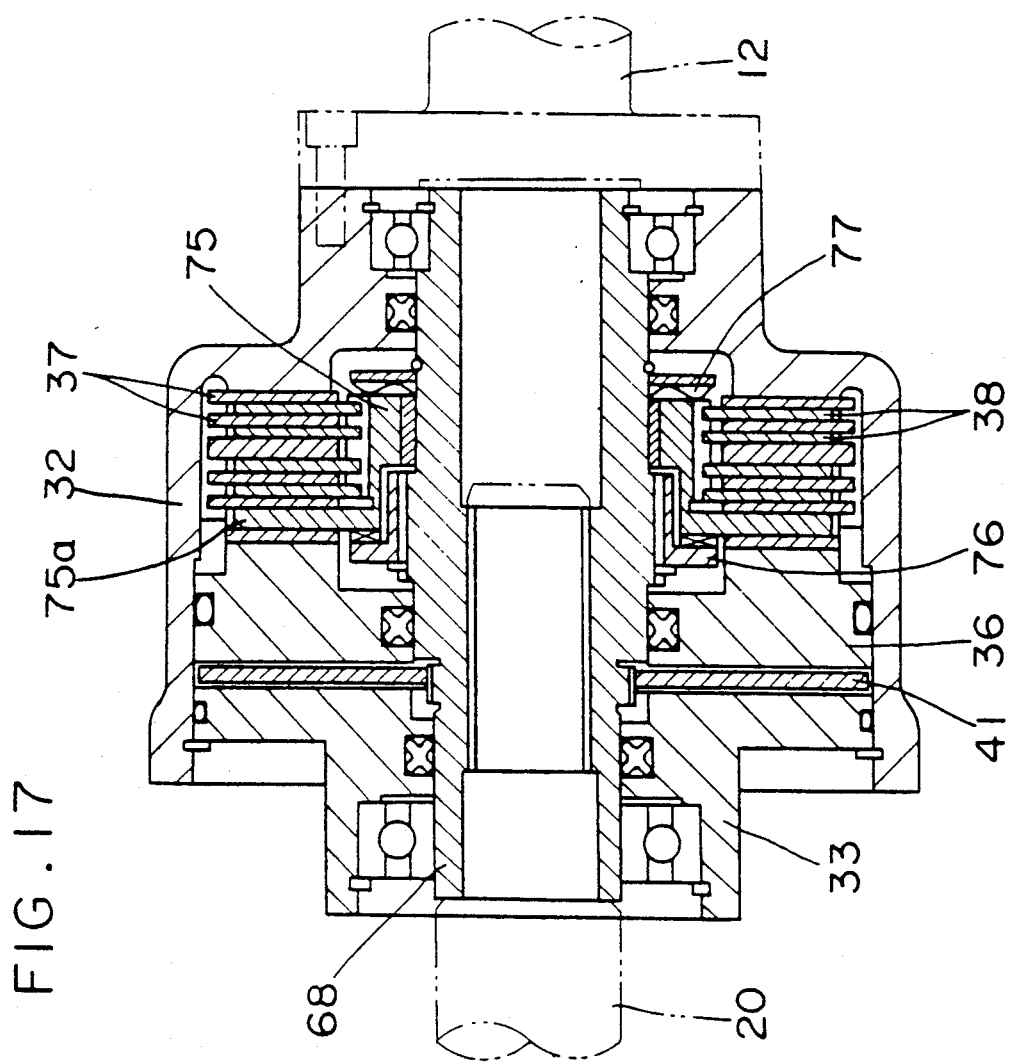
FIG. 17 is a longitudinal sectional view of a ninth embodiment of the present invention.
Figure 19:
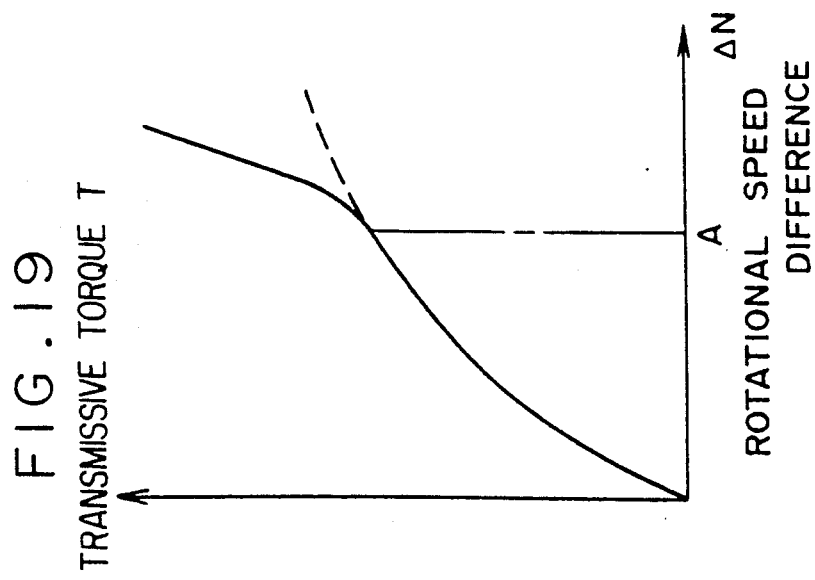
FIG. 19 is a graph showing a transmissive torque characteristic of the tenth embodiment.

Another improvement of the present invention is illustrated as a ninth embodiment in FIGS. 17 through 19. This particular improvement includes a mechanism which is designed to augment the pressing force acting on the clutch discs 37, 38 when the rotational speed difference between front and rear drive shafts 12, 20 exceeds a predetermined speed so that excessive abrasion of the clutch discs 37, 38 can be obviated. To this end, the mechanism comprises an inner clutch hub 75 rotatably carried over the rear shaft sleeve 68. The hub 75 is spline-engaged at its external surface with the inner clutch discs 38 and is formed with a pressing flange portion 75a interposed between the piston 36 and the clutch discs 37, 38. A flanged transmission sleeve 76 which is spline-engaged over the shaft sleeve 68 is formed with a circular array of radial extending teeth 76a at a flange portion thereof, as shown more detail in FIG. 18. Likewise, another circular array of radial extending teeth 75a are formed on the clutch hub 75 for engagement with those on the transmission sleeve 76. Further, a spring 77 is provided to bring the teeth 75a on the hub 75 into engagement with those on the sleeve 76. When the rotational speed difference between the front and rear drive shafts 12, 20 exceeds the predetermined speed indicated at A in FIG. 19, each of the teeth 76a on the sleeve 76 causes the mating one of the teeth 75a on the hub 75 to slightly slide thereon by the wedge action therebetween, as indicated by the phantom line in FIG. 18. As a result, the hub 75 is axially moved against the spring 76 to apply an augmentative force to the clutch discs 37, 38 in addition to that applied by the piston 36. Consequently, the frictional sliding movements between the clutch discs 37, 38 can be prevented. This advantageously results on one hand in increasing the transmissive torque at a larger rate as the rotational speed difference ($\Delta N$) further increases beyond the predetermined speed (A) shown in FIG. 19, and on the other hand in obviating the excessive abrasion of the clutch discs 37, 38.

Figure 20:
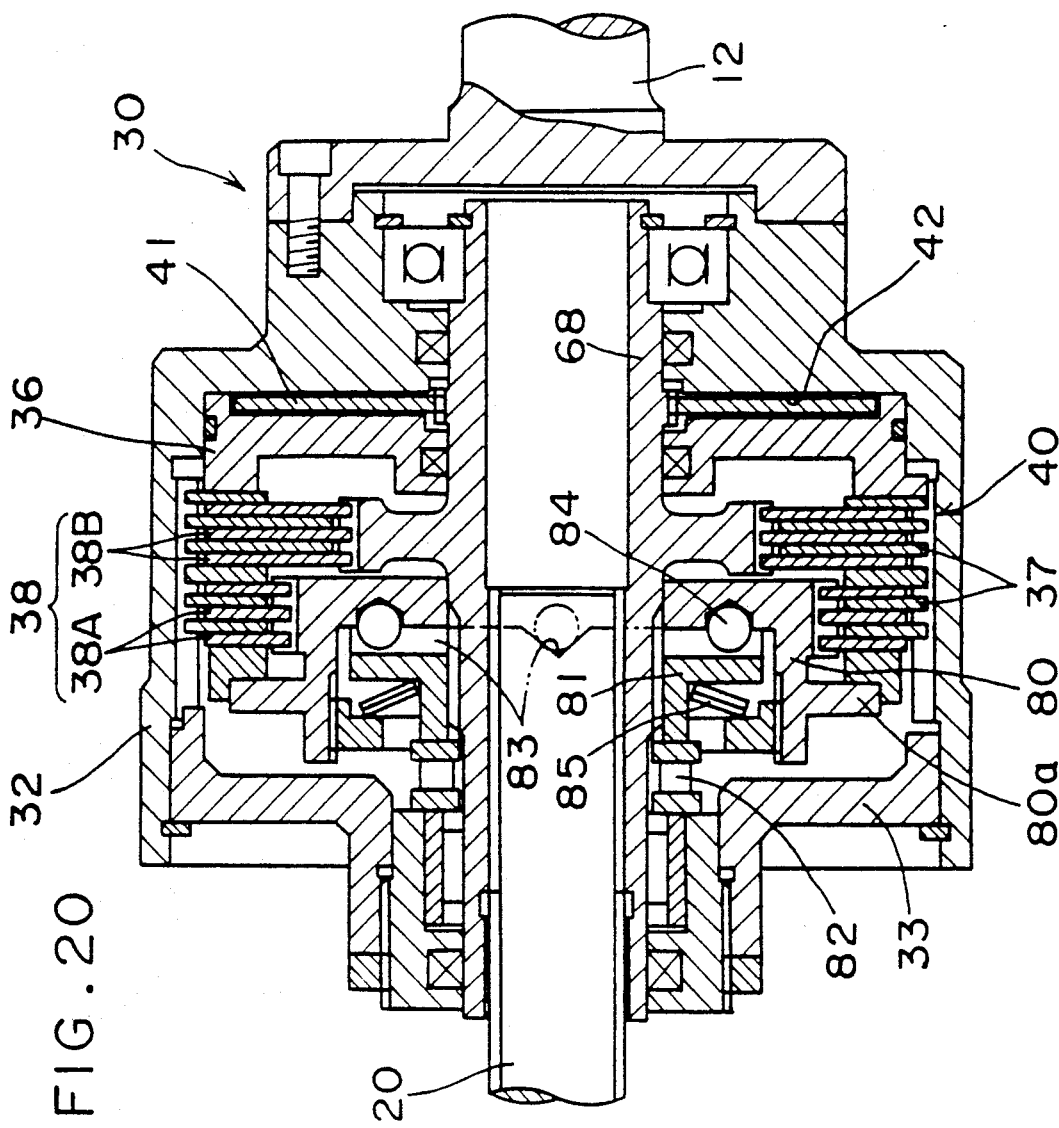
FIG. 20 is a longitudinal sectional view of a tenth embodiment of the present invention.

Referring to FIG. 20, there is shown a tenth embodiment which is further improved from the aforementioned ninth embodiment. In this improvement, the rotor chamber 42 which rotatably receives the rotor 41 having the pair of diametrically opposite blade portions 41a, 41b is defined as a side groove formed at one side of the piston 36, so that an annular circumferential edge portion at one side of the piston 36 is seated on the bottom surface of a cylindrical bore of the rotary housing 32. Further, the half 38B of the inner clutch discs 38 are spline-engaged with the shaft sleeve 68 into which one end of the rear drive shaft 20 is inserted for spline engagement, while the remaining half 38A of the inner clutch discs 38 are spline-engaged with an inner disc hub 80 which is rotatably carried over the shaft sleeve 68. The hub 80 is formed with a flange portion 80a, which cooperates with the piston 36 to press the clutch discs 37, 38 thereupon. A flanged sleeve 81 which is restricted by a thrust bearing 82 to retract away from the hub 80 is carried over the shaft sleeve 68 and is spline-engaged therewith. A cross V-slot 83 is formed at a flange portion of the sleeve 81, while four retaining holes (not numbered) are formed at one side surface of the hub 80 which faces the flange portion of the flanged sleeve 81. The V-slot 83 and retaining holes cooperate to retain four steel balls 84 respectively in the retaining holes. Washer springs 85 are interposed between the hub 80 and the flanged sleeve 81 so as to urge the latter toward the former so that each of the balls 84 is normally seated at the center of each segment of the V-slot 83. However, when the front drive shaft 12 rotates relative to the rear drive shaft 20 at more than the predetermined speed as indicated at (A) in FIG. 19, each of the balls 84 rolls on a slanted surface of the mating V-slot segment, and the hub 80 is axially moved to augment the engagement between the clutch discs 37, 38. Thus, slippage between the clutch discs 37, 38 is prevented, whereby the transmissive torque is increased at the larger rate as shown in FIG. 19 as the rotational speed difference ($\Delta N$) between the drive shafts 12, 20 increases beyond the predetermined speed difference (A).

Figure 22:
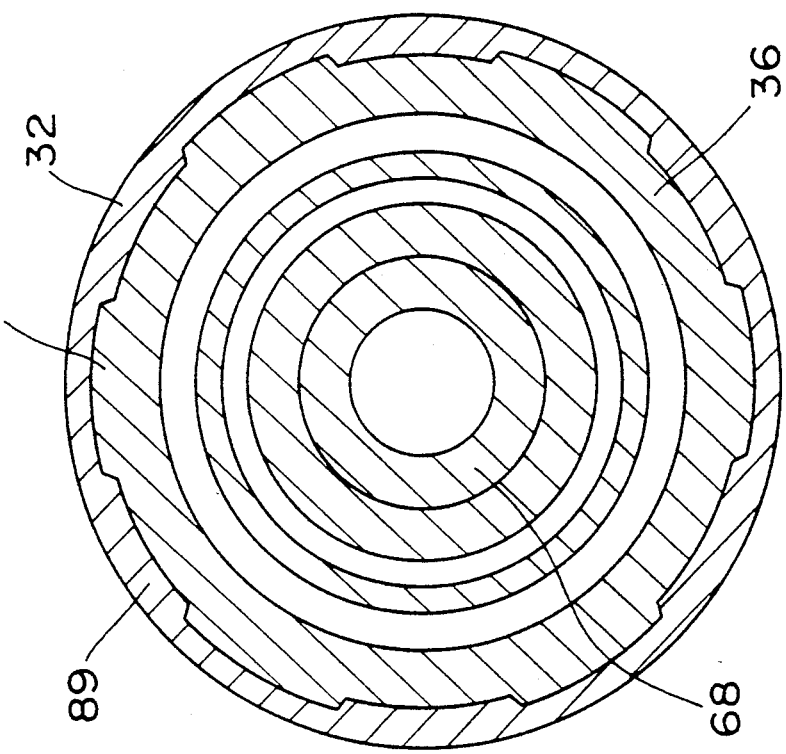
FIG. 22 is a cross-sectional view taken along the line XXII—XXII in FIG. 21.
Figure 21:
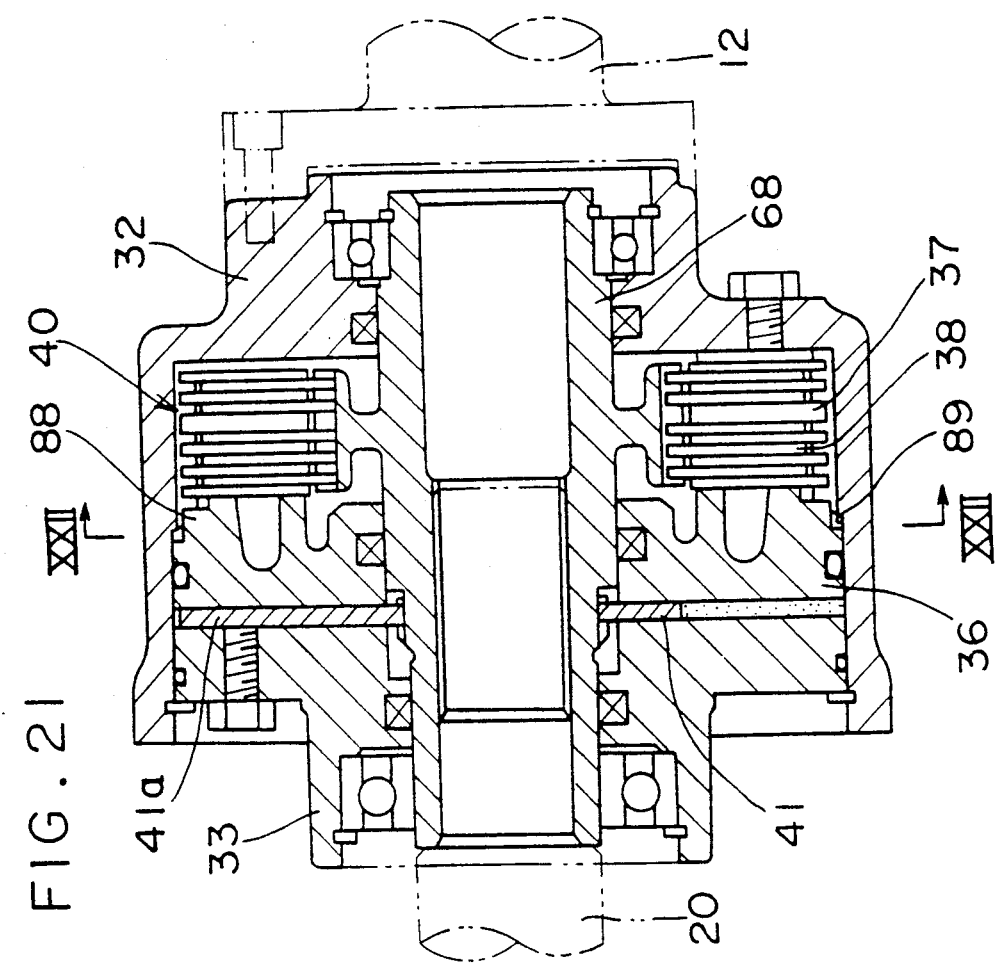
FIG. 21 is a longitudinal sectional view of an eleventh embodiment of the present invention.

Further, an eleventh embodiment of the present invention is improved in that any independent pin member is not used in connecting the piston 36 with the rotary housing 32 for integral rotation. More specifically, as shown in FIGS. 21 and 22, the piston 36 is formed with a spline portion 88 at its circumferential edge portion close to the clutch discs 37, 38, and the spline portion 88 is engaged with a mating spline portion 89 which is formed at the internal surface of the rotary housing 32 to engage with the outer clutch discs 37. Thus, the failure to assemble any such pin member into the device can be obviated because no such pin member is employed.

Figure 23:
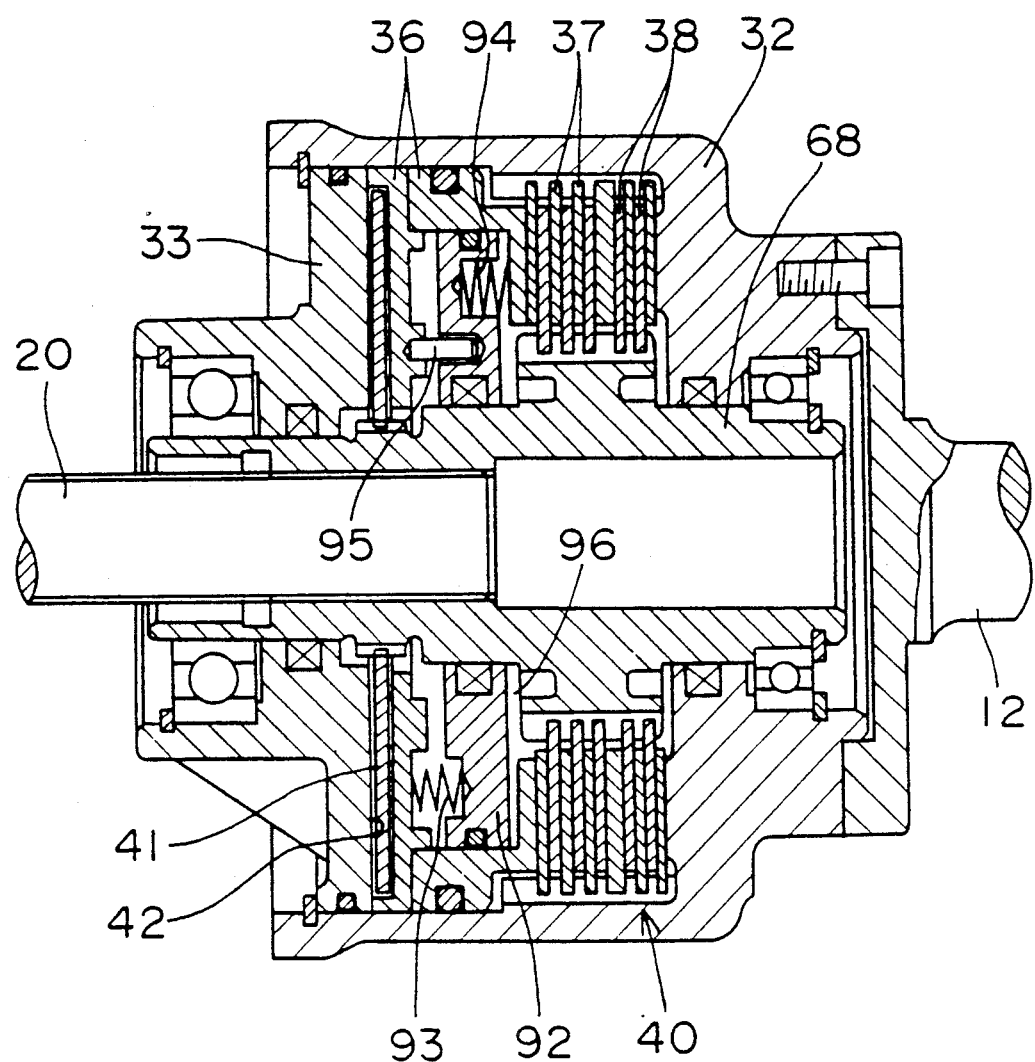
FIG. 23 is a longitudinal sectional view of a twelfth embodiment of the present invention.

Finally, description will now be made with three other embodiments which are improved to absorb the thermal change in volume of a lubricant which is contained within a clutch plate chamber. In a twelfth embodiment shown in FIG. 23, the piston 36 for pressing the clutch discs 37, 38 receives therein an axially movable child piston 92 which is biassed by springs 93, 94 provided at opposite side thereof so as to be held at the neutral position of its movable stroke. A pin 95 is provided to restrict the relative rotation between the piston 36 and the child piston 92. The rotary housing 32 and the child piston 92 snugly fit over the shaft sleeve 68 so that a clutch disc chamber 96 is defined by the shaft sleeve 68, rotary housing 32, piston 36 and child piston 92. A lubricant for the clutch discs 37, 38 is filled within the chamber 96. In order to vary the effective volume of the chamber 96, the child piston 92 is axially moved against the springs 93, 94 when the volume of lubricant varies due to thermal changes.

Figure 24:
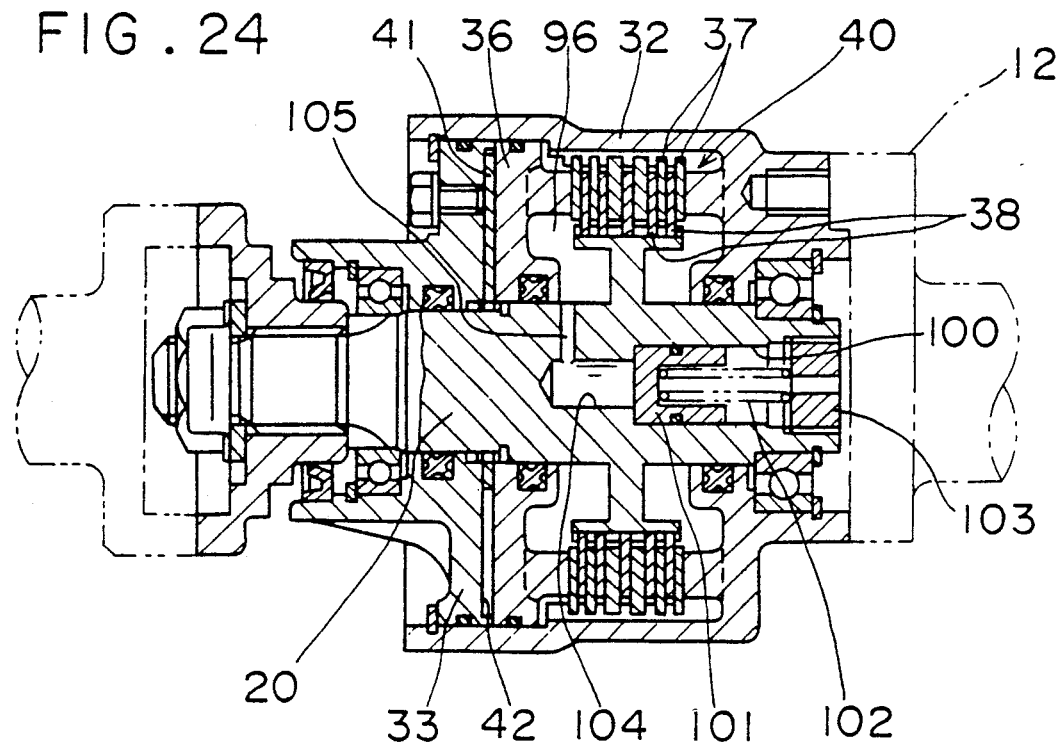
FIG. 24 is a longitudinal sectional view of a thirteenth embodiment of the present invention.
Figure 25:
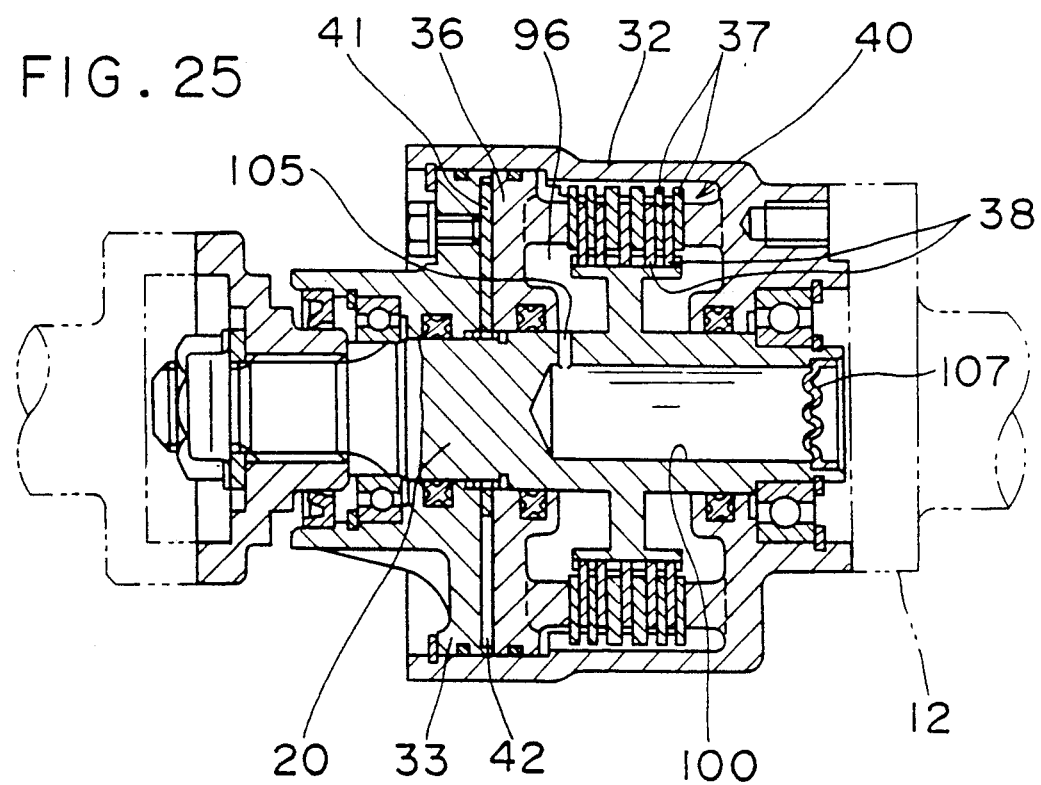
FIG. 25 is a longitudinal sectional view of a fourteenth embodiment of the present invention.

Referring to FIGS. 24 and 25, thirteenth and fourteenth embodiments are exemplified in a simpler form. In these embodiments, the rotary housing 32 and the rear end cap 33 fitted in the rear opening end of the rotary housing 32 directly carry the rear drive shaft 20. The housing 32 and the piston 36 fit over the external surface of the rear drive shaft 20, so that the clutch disc chamber 96 is defined by the housing 32, piston 36 and rear drive shaft 20. A generally cylindrical hole 100 is coaxially formed within the rear drive shaft 20. In the thirteenth embodiment shown in FIG. 24, an absorption piston 101 is slidably fitted in the cylindrical hole 100 and is biassed by means of a spring 102 which is seated on a nut 103 screwed in an opening end of the cylindrical hole 100. A stepped small hole 104 formed at the bottom of the hole 100 communicates with the clutch disc chamber 96 through a radial passage 105. In the fourteenth embodiment shown in FIG. 25, a diaphragm 107 is secured to close the opening end of the cylindrical hole 100. Thus, the expansion and contraction in volume of the lubricant within the clutch disc chamber 96 can be absorbed thanks to the axial movement of the absorption piston 101 or thanks to the deformation of the diaphragm 107. It is to be noted that the absorption mechanism including the piston 101 or the diaphragm 107 may be provided not within the rear drive shaft 20, but within the rotary housing 32.

Although the rotor 41 is driven by the rear drive shaft 20 or the shaft sleeve 68 into which the shaft 20 is fitted in any of the aforementioned embodiments, it may be modified to be driven bodily with the rotary housing 32 in which modified instance, the piston 36 and the front end cap 31 interposing the rotor 41 therebetween may be rotated bodily with the shaft 20 or the shaft sleeve 68.

Further, any of the aforementioned torque transmission device may be applied to automobiles of the type wherein the rotational torque generated by the engine 10 is transmitted first to the rear drive shaft 20 for the rear wheels 23, 24 and then, to the front drive shaft 12 for the front wheels 15, 16.

Obviously, other variations and modifications of the present invention are possible in light of the above teachings. It is therefore to be understood that within the scope of the appended claims, the present invention may be practiced otherwise than as specifically described herein.

What is claimed is:

1. A torque transmission device for a four-wheel drive vehicle, having a multiple disc clutch provided between a front drive shaft and a rear drive shaft for transmitting rotational torque between said front and rear drive shafts and an operating piston for actuating said multiple disc clutch, said torque transmission device further comprising:

a rotary housing connected to one of said front and rear drive shafts for integral rotation therewith and receiving said operating piston therein, said rotary housing and said operating piston defining therebetween an axially narrow circular rotor chamber which shares a common axis with said front and rear drive shafts;

a rotor received within said rotor chamber and drivingly connected with the other of said front and rear drive shafts, said rotor being formed with a plurality of radially extending blade portions, each of said blade portions having an axial thickness substantially equal to the axial width of said rotor chamber; and high viscous fluid filled within said rotor chamber for generating pressure acting on said operating piston when said rotor is rotated relative to said rotary housing and said operating piston upon relative rotation between said front and rear drive shafts, wherein each of said blade portions is provided with a pair of slanted surfaces at at least a forward end in the rotational direction of said rotor to form a wedge shape at said forward end.

2. A torque transmission device having a rotational torque transmitting clutch provided between first and second rotation shafts for transmitting rotational torque between said first and second rotational shafts and a piston for operating said rotational torque transmitting clutch, said torque transmission device further comprising:

a rotary housing connected with said first rotational shaft for bodily rotation with said first rotational shaft and receiving said piston therein, said rotary housing defining between itself and said piston an axially narrow circular rotor chamber which is concentric with said first and second rotational shafts;

a rotor received within said rotor chamber and rotatable bodily with said second rotational shaft, said rotor having at least one radially extending blade portion for effecting fluid displacement when said rotor is rotated relative to said rotary housing, said at least one blade portion having an axial thickness substantially equal to the axial width of said rotor chamber; and high viscous fluid filled within said rotor chamber for generating within said rotor chamber a pressure acting on said piston as a result of being displaced by said at least one blade portion when said rotor is rotated upon occurrence of relative rotation between said first and second rotational shafts, wherein said at least one portion is provided with a pair of slanted surfaces at at least a forward end in the rotational direction of said rotor to form a wedge shape at said forward end.

3. A torque transmission device having a rotational torque transmitting clutch provided between first and second rotation shafts for transmitting rotational torque between said first and second rotational shafts and a piston for operating said rotational torque transmitting clutch, said torque transmission device further comprising:

a rotary housing connected with said first rotational shaft for bodily rotation with said first rotational shaft and receiving said piston therein, said rotary housing defining between itself and said piston an axially narrow circular rotor chamber which is concentric with said first and second rotational shafts;

a rotor received within said rotor chamber and rotatable bodily with said second rotational shaft, said rotor having at least one radially extending blade portion for effecting fluid displacement when said rotor is rotated relative to said rotary housing, said at least one blade portion having a width substantially equal to a width of said rotor chamber between said rotary housing assembly and said piston; and high viscous fluid filled within said rotor chamber for generating within said rotor chamber a pressure acting on said piston as a result of being displaced by said at least one blade portion when said rotor is rotated upon occurrence of relative rotation between said first and second rotational shafts, wherein said rotor is provided with portions producing a force as a result of rotation of said rotor to cause said rotor to be positioned at a mid portion position of said rotor chamber in the axial direction of said second rotational shaft during the rotation of said rotor.

* * * * *